UNITED STATES PATENT OFFICE.

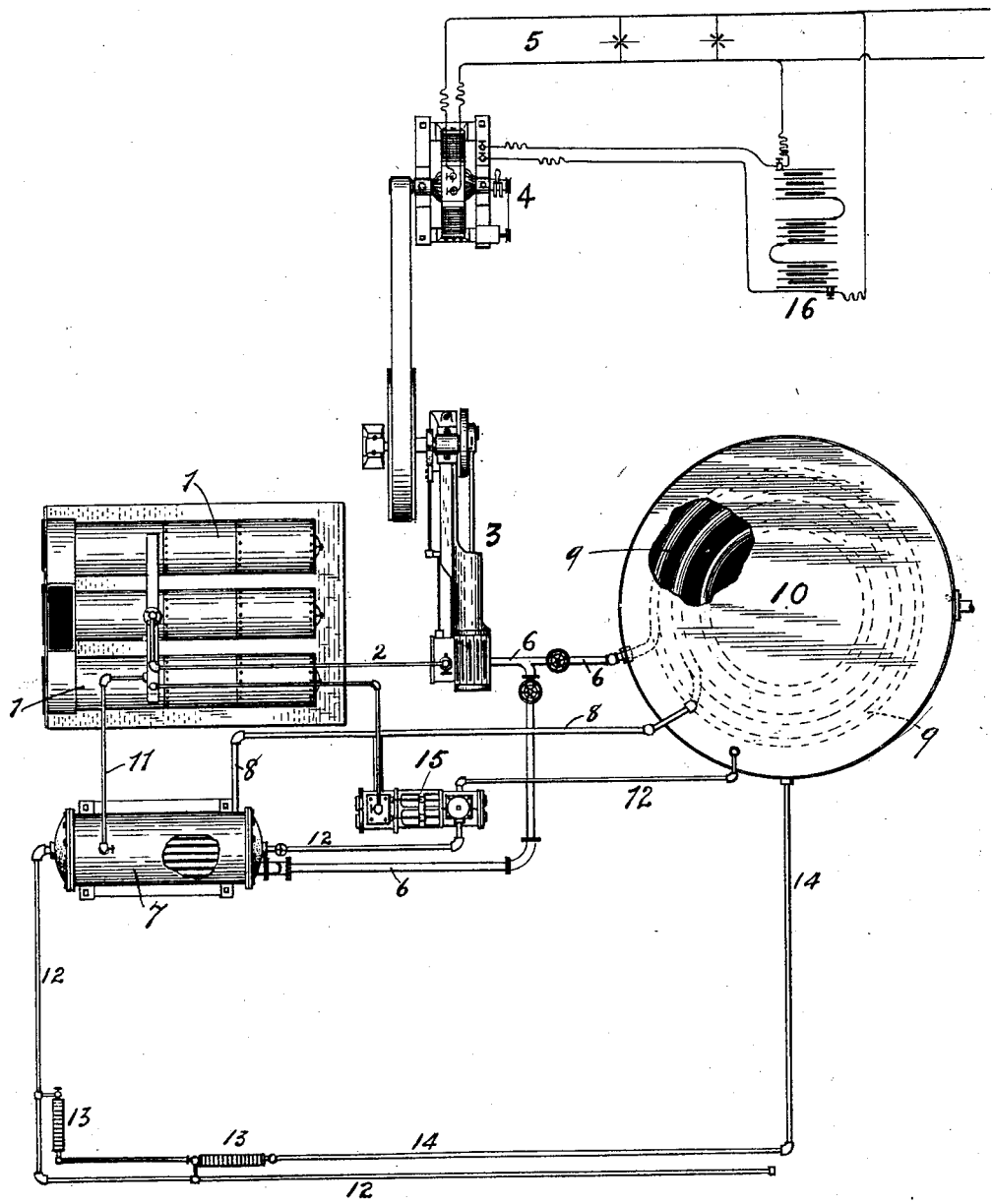

HOMER T. YARYAN, OF TOLEDO, OHIO.

APPARATUS FOR HEATING AND LIGHTING.

SPECIFICATION forming part of Letters Patent No. 549,664, dated November 12, 1895.

Application filed August 6, 1894. Serial No. 519,526. (No model.)

*To all whom it may concern:*

Be it known that I, HOMER T. YARYAN, a citizen of the United States, residing at Toledo, Lucas county, Ohio, have invented certain new and useful Improvements in Apparatus for Heating and Lighting, of which the following is a specification.

In the production by dynamos of electricity for lighting purposes a plant of boilers, engines, and dynamos equal to the maximum load during the lighting period is necessary. In order to utilize for heating purposes the exhaust-steam from these engines, there must either be a great loss of exhaust-steam during the maximum demand for light, or if the heating service is extensive enough to employ all of the exhaust-steam during such period then to maintain a proper degree of heat constantly large quantities of live steam must be used during the minimum consumption of light.

My invention relates to and its object is to provide means for overcoming the difficulty here pointed out; to provide an apparatus, plant, or station for lighting by electricity and for heating by the circulation of hot liquid, and more particularly for storing up the excess of heat generated during the lighting period to be drawn upon and utilized for heating purposes either constantly or as occasion may require. I attain these objects by means of the apparatus and arrangement of parts hereinafter described, and shown in the accompanying drawing, made part hereof, in which the single plan view illustrates my invention.

In the drawing, 1 indicates a battery of steam-boilers or other suitable steam-generating apparatus, connected by steam-pipe 2 with steam-engine 3, which gives motion to the dynamo 4, from which lead wires 5 for electric-lighting or other purposes. The steam-engine exhausts through pipe 6 into the steam-coils of a water-heater 7, which coils lead through pipe 8 into steam-coils 9 in storage tank or reservoir 10, which is filled with water or other liquid. If preferred, however, the coils 9 may be dispensed with and the steam may be led directly into the stored liquid in reservoir 10. The steam-coils of the heater 7 are also connected directly with the boilers by means of pipe 11, through which live steam may be admitted to the heater when required. The exhaust-steam pipes leading from the engine are suitably valved, as shown, so that the steam may be directed either into the water-heater or directly into the reservoir, as may be desired. From the reservoir leads distributing pipe or main 12, to which are connected radiators 13, which discharge into pipe 14, which leads back into the reservoir. Distributing-pipe 12 is also connected with the water-chamber of the water-heater 7. In the line of pipes 12 14 is a pump 15, designed to give a forced circulation from the reservoir through the heater, circulating-pipes 12 14, and radiators 13 back to the reservoir. In small plants the pump may be dispensed with and the flow of liquid in the circulating-pipes may be obtained by gravity; but in practice the pump will be found preferable. There may be, if desired, storage-batteries 16, connected with and adapted to be charged by the dynamos and connected with the electric lines 5.

The relative proportions and capacities of the boilers, engine, dynamo, hot-water-storage capacity, and heating service should be such that no exhaust-steam will be wasted during the maximum load upon the engine, and such that but little or no live steam will be required during the minimum load, except in extremely cold weather.

The operation of my device is as follows: During the maximum lighting period, which in lighting with incandescent lamps is about six hours out of each twenty-four hours, and while the dynamo is in motion the entire exhaust of the engine, through pipe 6, passes into and through the coils of water-heater 7 and thence into and through the steam-coils of the storage tank or reservoir 10. This reservoir, which is preferably of iron and suitably jacketed to prevent radiation, is approximately of such capacity that it will require all of the waste steam of the engine during its working hours and during the maximum load upon the boilers and engine to bring the contents of the reservoir to a temperature near the boiling-point. During the maximum lighting period the exhaust-steam passing through the heater 7 will maintain the water required for the heating service at a proper temperature, and enough hot steam will pass over to the coils of the reservoir to bring its contents to about the boiling-point. The pump 15 takes the hot liquid from the reservoir through pipe 12 and forces it through the radiators or equivalent devices, where it gives off part of its heat, and then returns through pipe 14 to the reservoir. If the water supplied to the radiators by the pump falls below the required temperature during the minimum load, sufficient live steam is admitted to the water-heater 7 from one or more of the boilers to maintain the proper temperature until the exhaust-steam from the engine can again be utilized and until the contents of the reservoir are again heated to a proper temperature by waste steam during the maximum lighting period. The storage-battery, which is charged by the dynamo while the engine is running and exhausting at full load, is designed to supply the few lamps in use during the minimum lighting period, when the engine is at rest.

It will be seen that by the system above described the heat heretofore wasted in the exhaust-steam from dynamo-engines while running at full load during the maximum lighting period may be now stored to be drawn upon and utilized at will.

What I claim as my invention, and desire to secure by Letters Patent, is—

1. In an apparatus for the utilization of the excess of heat generated by an electric plant during the period of its maximum load, the combination of the following elements: a steam generator, a steam engine connected therewith, an electric generator connected with said steam engine, electric lines connected with said electric generator, a reservoir of liquid suitably connected with the exhaust of said steam engine, said reservoir of liquid being of such volume as will absorb, approximately, all of the heat of the waste steam of said steam engine during the period of its maximum load, a steam heater connected with the exhaust of said engine and with said reservoir, and hot water circulating pipes connected with said reservoir and with said steam heater, substantially as and for the purpose specified.

2. In an apparatus for the utilization of the excess of heat generated by an electric plant during the period of its maximum load, the combination of the following elements: a steam generator, a steam engine connected therewith, an electric generator connected with said steam engine, electric lines connected with said electric generator, a reservoir of liquid suitably connected with the exhaust of said steam engine, said reservoir of liquid being of such volume as will absorb, approximately, all of the heat of the waste steam of said steam engine during the period of its maximum load, a steam heater connected with the exhaust of said engine and with said reservoir, hot water circulating pipes connected with said reservoir, and with said steam heater and means for causing the circulation of fluid in said hot water circulating pipes, substantially as and for the purpose specified.

3. The herein described apparatus for the utilization of the excess of heat generated by an electric lighting plant during the period of its maximum load, comprising a steam generator, a steam engine and dynamo, electric lines leading therefrom, a reservoir of liquid suitably connected with the exhaust of said steam engine of such volume as will absorb, approximately, all of the heat of the waste steam of said steam engine during the period of its maximum load, a steam water heater having its steam coils suitably connected with the exhaust of said engine and with said boilers and with said reservoir, hot water circulating pipes connected with said reservoir and with said heater, radiators on said hot water circulating pipes, and means for causing the circulation of fluid in said circulating pipes, all substantially as and for the purpose specified.

4. The combination with a circuit of water-pipes, including radiators, of a water reservoir in said circuit, a source of exhaust steam adapted to heat the water in said reservoir, and means for changing the temperature of the water of said circuit, between said reservoir and said radiators, substantially as and for the purpose specified.

HOMER T. YARYAN.

Witnesses:
ISAAC N. HUNTSBERGER,
L. E. BROWN.